United States Patent
Knapp et al.

(10) Patent No.: US 6,579,501 B1
(45) Date of Patent: *Jun. 17, 2003

(54) APPARATUS FOR CARRYING OUT WET CHEMICAL REACTIONS UNDER PRESSURE

(75) Inventors: Günter Knapp, Graz (AT); Howard M. Kingston, Pittsburgh, PA (US)

(73) Assignee: Berthold GmbH and Co. KG, Badwildbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,623

(22) Filed: Jan. 8, 1998
(Under 37 CFR 1.47)

(30) Foreign Application Priority Data

Jan. 9, 1997 (DE) .......................................... 197 00 530

(51) Int. Cl.[7] .............................. B01J 3/03; G05D 7/10; F28D 21/00
(52) U.S. Cl. ...................... 422/208; 422/105; 422/107; 422/110; 422/198; 422/242
(58) Field of Search .......................... 422/21, 242, 307, 422/186, 186.29, 129, 241, 186.04, 906, 105, 107, 110, 198–208; 210/761; 219/686

(56) References Cited

U.S. PATENT DOCUMENTS

| | | | | |
|---|---|---|---|---|
| 2,664,348 A | * | 12/1953 | Bonilla ........................ | 422/242 |
| 3,649,534 A | * | 3/1972 | Schotte ........................ | 422/208 |
| 4,265,860 A | * | 5/1981 | Jennings et al. ............. | 422/280 |
| 5,268,102 A | * | 12/1993 | Clay et al. ................... | 210/634 |
| 5,414,259 A | | 5/1995 | Kingston ..................... | 250/283 |
| 5,447,077 A | * | 9/1995 | Lautenschlager ........ | 73/863.11 |
| 5,584,989 A | * | 12/1996 | Jameson ..................... | 210/137 |
| 5,616,681 A | * | 4/1997 | Itoh et al. ................... | 528/279 |
| 5,725,835 A | * | 3/1998 | Lautenschlager ............ | 422/129 |
| 5,750,008 A | * | 5/1998 | Lautenschlager ............ | 203/43 |
| 5,785,868 A | * | 7/1998 | Li et al. ...................... | 210/761 |
| 5,830,417 A | | 11/1998 | Kingston ............... | 422/486.29 |
| 5,858,178 A | * | 1/1999 | Lautenschlager ............ | 203/73 |
| 5,883,349 A | | 3/1999 | Kingston ............... | 204/157.15 |
| 5,932,075 A | * | 8/1999 | Strauss et al. ......... | 204/157.15 |

FOREIGN PATENT DOCUMENTS

WO 13133 * 3/2000

* cited by examiner

Primary Examiner—Jerry D. Johnson
Assistant Examiner—Alexa A. Doroshenk
(74) Attorney, Agent, or Firm—St. Onge Steward Johnston & Reens LLC (57) ABSTRACT

The present invention refers to an apparatus for carrying out wet chemical reactions under pressure comprising a pressure vessel in which a reaction liquid can be provided and which is adapted to be sealed in a pressure-tight manner by closure means. When the reaction liquid is heated, the pressure in the interior of the pressure vessel will increase; the stressability limit of the pressure vessel must, however, not be exceeded. The total pressure in the interior is composed of the partial pressures of the reaction liquid and of the reaction products. The reaction liquid must be maintained at so low a temperature that the sum of the partial pressures of the reaction liquid and of the gaseous reaction products does not exceed the maximum load value of the pressure vessel. For achieving a wet chemical reaction which is as fast and as efficient as possible, the highest possible temperature of the reaction liquid is, however, required. In accordance with the present invention these problems are solved by a rinsing device for rinsing the pressure vessel while removing gaseous reaction products from the pressurized pressure vessel and while maintaining a predetermined pressure therein. This has the effect that the gaseous reaction products are removed from the pressure vessel so that said gaseous reaction products will neither displace the reaction equilibrium nor influence the pressure conditions.

25 Claims, 5 Drawing Sheets

APPARATUS FOR CARRYING OUT WET CHEMICAL REACTIONS UNDER PRESSURE

TECHNICAL FIELD

The present invention refers to an apparatus for carrying out wet chemical reactions under pressure comprising a pressure vessel in which a reaction liquid can be provided and which is adapted to be sealed in a pressure-tight manner by closure means.

BACKGROUND ART

Such apparatuses for carrying out wet chemical reactions under pressure are known e.g. from U.S. Pat. No. 4,882,128 or from European patent applications EP 0 416 759 A1 and EP 0 461 383 A2.

Wet chemical reactions, such as disintegration and decomposition, hydrolysis or synthesis, are very important for analysing and synthesizing substanes. The higher the reaction temperature is, the faster and the more complete such wet chemical reactions will normally take place. Hence, closed reaction vessels are used in accordance with the above-mentioned prior art so that higher pressures and, consequently, higher boiling temperatures of the reaction liquid for the wet chemical reaction can be used. For this purpose, the reaction liquid is provided in a pressure vessel whose interior can be acted upon by pressure. When the reaction mixture is heated, e.g. by a microwave field generated by a microwave generator, the desired increase in the reaction speed is achieved, whereby new possibilities are provided for efficient methods that can be used in the analysis and synthesis of substances.

Closed reaction vessels have, however, various drawbacks. The pressure in the vessel results from the sum of the partial pressures of the substances contained in the pressure vessel. The total pressure is therefore composed of the vapour pressure of the reaction liquid and of the partial pressures of the gaseous reaction products. In view of the limited mechanical stressability of the closed pressure vessel, the sum of the partial pressures must not exceed a specific maximum pressure. It follows that, the higher the partial pressures of the gaseous reaction products formed in the course of the reaction, the lower the maximum applicable vapour pressure of the reaction liquid will be. This means that, in view of the fact that the vapour pressure increases continuously as the temperature increases, there is an upper limit to the temperature of the reaction liquid.

In the case of oxidative acid decomposition of organic samples, for example, gaseous carbon dioxide is produced. The larger the amount of organic substance that is decomposed in a specific pressure vessel at a constant pressure is, the lower the vapour pressure of the decomposing acid must be and therefore the lower the maximum possible boiling temperature will be.

A further drawback occurring when closed reaction vessels are used is to be seen in the fact that the gaseous reaction products cannot escape and that, consequently, the reaction equilibrium is displaced towards the starting product.

SUMMARY OF THE INVENTION

Taking into account the drawbacks of the prior art, it is therefore the object of the present invention to provide an apparatus for carrying out wet chemical reactions under pressure of the kind referred to at the beginning by means of which a faster and more efficient course of reaction can be achieved.

According to the present invention, this object is achieved by an apparatus of the type referred to at the beginning, which is characterized in that a rinsing device is provided for rinsing the pressure vessel while removing gaseous reaction products from the pressurized pressure vessel and while maintaining a predetermined pressure therein. The present invention therefore permits wet chemical reactions to be carried out under pressure while continuously removing gaseous reaction products, whereby an influence of the partial pressures of the gaseous reaction products on the total pressure in the interior of the pressure vessel is excluded. In addition, the displacement of the reaction equilibrium towards the starting products, which increasingly inhibits the progress of reaction, is prevented by the continuous removal of the gaseous reaction products from the. pressure vessel acted upon by pressure.

According to an advantageous further development, the rinsing device comprises a source for a pressurized gas as well as a first gas conduit extending from said source into the interior of the pressure vessel, and, in addition, a second gas conduit extending from the interior of said pressure vessel to the outside thereof and including a first restrictor for producing a first predetermined flow rate. Preferably, also the first gas conduit includes a restrictor for producing a predetermined flow rate. Said first and second gas conduits including said first and second restrictors constitute a simple, but efficient embodiment of the rinsing device; by means of the restrictors in said first and second gas conduits, the flow rates for the supply and discharge of a purge gas can be preselected such that a pressure, which is predetermined by means of a pressure regulator valve, can be maintained in the reaction vessel. This predetermined pressure determines the boiling temperature of the reaction liquid.

According to a further advantageous embodiment, said first and second restrictors each comprise means for adjusting a flow rate. It follows that the conditions for carrying out wet chemical reactions can be adjusted individually, e.g. in dependence upon the reaction starting and end products.

According to a further advantageous embodiment, the apparatus for carrying out wet chemical reactions under pressure comprises a recondensation device provided in the interior of the pressure vessel and used for condensing evaporated reaction liquid. This recondensation device prevents losses of reagents and of important constituents of the sample. Hence, the efficiency of the wet chemical reaction under pressure is increased still further.

In accordance with advantageous further developments, this recondensation device can be implemented either as a cooling body which is adapted to be cooled such that the evaporated reaction liquid condenses, or as a means for applying a cooling gas stream to an area of the reaction vessel constituting an upper area with regard to the direction of the force of gravity, said reaction vessel being arranged in the pressure vessel and being adapted to hold the reaction liquid in a lower area thereof.

In accordance with a further advantageous development of the present invention, a heating device is provided for increasing the temperature of the reaction liquid. In accordance with an advantageous embodiment, this heating device consists especially of a microwave generator for generating a microwave field passing through the reaction liquid. By means of the microwave field produced by said microwave generator, a predetermined temperature-time characteristic can be controlled precisely through the power of the microwave field. In the case of a predetermined constant microwave power, a freely selectable time-temperature characteristic of the reaction liquid can also be achieved by controlling the pressure in the interior of the pressure vessel by the pressurized purge gas supplied, provided that a controllable pressure regulator valve is used in the gas conduit leading into the pressure vessel.

According to a further advantageous embodiment, a device is provided for feeding gaseous or liquid reaction substances into the pressure vessel. This feed device preferably comprises a multiway valve with a sample loop, said multiway valve being adapted to be switched at least to a first and to a second position for receiving in said sample loop a substance to be fed under a preselectable pressure at said first position and for feeding the received substance into the pressurized pressure vessel at said second position. With the aid of the multiway valve, a substance to be fed can be introduced e.g. without pressure into the sample loop of the multiway valve so that the amount of the substance to be fed can be determined precisely. When the multiway valve is switched to the second position, the substance introduced into the sample loop is fed under pressure into the pressure vessel.

According a further advantageous embodiment, a temperature sensor is provided for determining the temperature of the reaction liquid. This temperature sensor is especially arranged in a channellike indentation provided in the area of the lower end of a reaction vessel, whereby a particularly precise temperature measurement is possible.

Further advantageous embodiments are disclosed by the subclaims.

BRIEF DESCRIPTION OF THE DRAWINGS

In the following, the present invention will be explained and described in detail on the basis of preferred embodiments which serve as examples and with reference to the drawings enclosed, in which.

DESCRIPTION OF THE PREFERRED EMBODIMENT

A first embodiment of the apparatus for carrying out wet chemical reactions under pressure according to the present invention is described hereinbelow making reference to FIG. 1. The apparatus comprises a pressure vessel 1 closed by a cover 2 via a gastight seal 3. Within said pressure vessel there is a removable reaction vessel 4 in the lower area of which (with regard to the force of gravity) the reaction liquid 5 can be provided, said reaction liquid 5 being shown in the drawing by way of example. The lower area of the pressure vessel and of the reaction vessel, in which the reaction liquid 5 is preferably provided, is located in the interior of a microwave resonator 33 communicating with a microwave generator 32 via a waveguide 43. Within said microwave resonator 33 a microwave field 15 can be generated. A first gas conduit 12 extends through the cover 2 which is attached to the pressure vessel 1 such that no gas can escape; said gas conduit 12 extends in a space between the reaction vessel 4 and the pressure vessel 1 down into the area of the bottom of the reaction vessel 4. In the first gas conduit 12, a restrictor 17 is provided for limiting the gas flow rate through said first gas conduit 12. In addition, said first gas conduit 12 is connected via a pressure regulator valve 42 to a source 35 of pressurized purge gas.

Furthermore, a second gas conduit 36 extends through the cover 2, said second gas conduit 36 leading via a second restrictor 14, which is used for limiting the flow rate through the second gas conduit, to an outlet conduit 13. A gas conduit 70 branches off at a point between the end of the second gas conduit 36, which is located in the interior of the pressure vessel, and the restrictor 14, said gas conduit 70 being adapted to be connected via a valve 16 to a vacuum source which is not shown.

In the interior of the pressure vessel 1, a cooling body 6 is provided, which is attached to the cover 2 and implemented as a cold finger. The cold finger 6 projects into the upper area of the reaction vessel 4. The cold finger 6 is hollow in the interior thereof and it is connected to a source of cooling liquid via a conduit 8 extending through the cover 2 and a valve 7. The conduit 8 for the cooling liquid extends down to a point close to the bottom of the cold finger 6. Between the valve 7 and the point where said cooling liquid conduit 8 passes through the cover 2, a vacuum conduit 10 is connected to said conduit 8 via a valve 9. A discharge conduit 11, which extends through the cover 2, ends in the upper area of the hollow cold finger 6.

In the following, the operation of the first embodiment according to the present invention will be described.

When a wet chemical reaction is carried out under pressure, the temperature of the reaction liquid 5 in the interior of the reaction vessel 4 can be increased by generating the microwave field 15. The pressure in the interior of the pressure vessel 1 always corresponds to the predetermined pressure of the pressure regulator valve 42. The temperature of the reaction liquid 5 can be increased until the vapour pressure of said liquid 5 corresponds to the pressure predetermined by means of the pressure regulator valve 42. The liquid then starts boiling and the temperature remains constant.

The gaseous reaction products produced during the wet chemical reaction are continuously removed from the pressure vessel by the purge gas via the second gas conduit 36 and: the restrictor 14 leading to the outlet, said purge gas being fed from the source 35 into the interior of the pressure vessel 1. The pressure of the purge gas can be adjusted freely by means of the pressure regulator valve 42. The temperature of the reaction mixture can be increased until the vapour pressure of the reaction mixture corresponds to the gas pressure adjusted. The flow rate of the purge gas is adjusted with the aid of the restrictor 14. The valve 16 leading to the vacuum conduit 70 permits the generation of a vacuum in the pressure vessel 1. In this case, the gas stream through the pressure vessel 1 is adjusted with the aid of the restrictor 17. The flow resistance of said restrictor 17 is from 10 to 100 times lower than that of the restrictor 14.

In the case of a specific predetermined pressure, a specific amount of gas is discharged via the restrictor 14 into the conduit 13. Since the flow resistance of the restrictor 17 is much lower than that of restrictor 14, a sufficient amount of gas is always resupplied via the conduit 12 so that the pressure in the interior of the pressure vessel 1 will always correspond to the pressure predetermined by the pressure regulator valve 42. If gases are set free during the reaction, they will flow off via the restrictor 14; in this case, a correspondingly smaller amount of purge gas is resupplied via the conduit 12 and the restrictor 17, since the amount of gas flowing off via the restrictor 14 remains approximately constant when the pressure is constant.

The restrictor 17 is especially also used for rapidly bleeding the liquid 5 at a low temperature. For this purpose, the valve 16 is opened and a vacuum is applied to conduit 36. This has the effect that, on the one hand, an insignificant amount of gas is sucked in the direction of 70 via the restrictor 14 and that, on the other hand, a vacuum is created in the interior of the pressure vessel 1, whereby a gas stream which is much too big would now suddenly flow through the pressure vessel 1 via the pressure regulator valve 42 and the conduit 12. The restrictor 17 restricts this gas stream to a usable amount. This reduced gas stream serves to discharge the vapours of the liquid from the pressure vessel 1.

When valve 7 is open, the cold finger 6 can be filled with a cooling liquid via the conduit 8, said cooling liquid flowing off via the discharge conduit 11 positioned at the upper end of said cold finger. Evaporated reaction liquid condenses on the cold finger 6 provided in the upper area of the reaction vessel 4, whereas the gaseous products, such as carbon dioxide in cases in which an organic sample is decomposed, can escape. The recondensed reaction liquid drops back into the reaction liquid 5 provided in the lower area of the reaction vessel 4. In a condition in which valve 7 is open and valve 9 is closed, cooling liquid circulates via the cooling liquid conduit 8 and the discharge conduit 11 through the cold finger 6 for cooling the same. For bleeding the reaction liquid 5 from the reaction vessel 4, the cooling liquid must be removed from the cold finger 6. For this purpose, valve 7 is closed and valve 9 is opened so that the cooling liquid is sucked from the cold finger 6 through the vacuum conduit 10.

Figure 1:
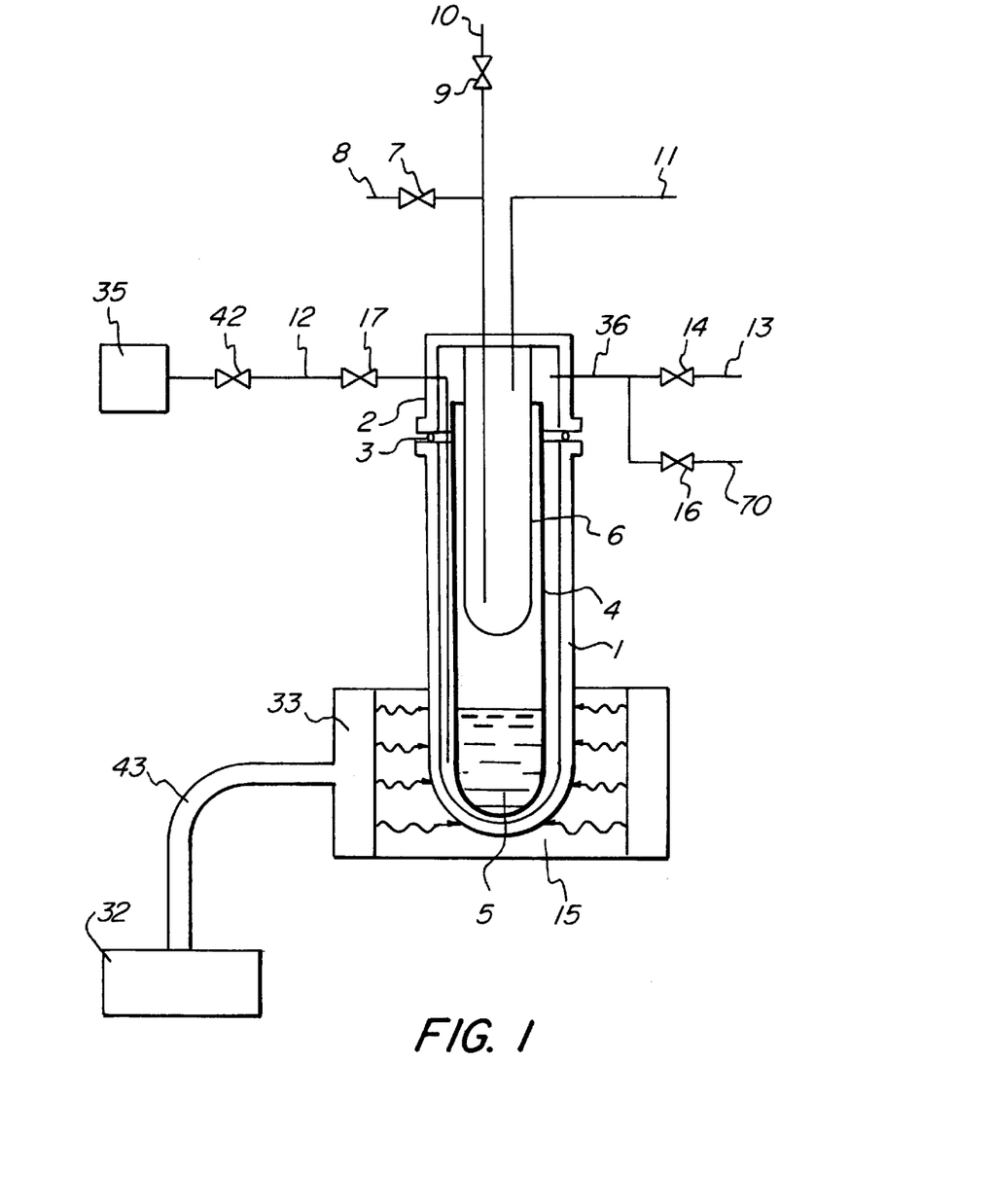
FIG. 1 shows a schematic side view of a first embodiment of an apparatus for carrying out wet chemical reactions under pressure according to the present invention.

It follows that the embodiment shown in FIG. 1 permits wet chemical reactions to be carried out while continuously removing gaseous reaction products and while selectively recirculating evaporated reaction liquid into the reaction vessel 4.

The reaction vessel 4 can preferably be removed from the pressure vessel 1 so that the reaction liquid can be filled into the reaction vessel 4 simply and without any problems prior to carrying out the wet chemical reaction. Subsequently, the reaction vessel 4 is introduced in the pressure vessel 1. The pressure vessel 1 is closed by the cover 2 and by means of the seal 3 such that not gas can escape. For attaching the cover 2 to the pressure vessel 1 and for removing it therefrom, it is possible to provide a mechanism for automatically charging the pressure vessel 1 with a reaction liquid.

When the reaction liquid has been introduced in the pressure vessel 1, a temperature-time program which is suitable for the intended reaction is started, the temperature of the reaction liquid 5 being controlled through the power of the microwave field 15. The maximum temperature results from the vapour pressure curve of the reaction liquid 5 in accordance with the pressure in the interior of the pressure vessel 1, said pressure being applied via the valve 42 and the restrictor 14. A predetermined temperature-time program can also be realized by using a constant power of the microwave field 15, which suffices to make the reaction liquid 5 boil also at high boiling temperatures. The boiling temperature of the reaction liquid 5 is adjusted as desired by suitably adjusting the purge gas pressure in the pressure vessel 1 by means of the pressure regulator valve 42. With the aid of the cold finger 6, the evaporated liquid is condensed and continuously recirculated into the reaction vessel 4.

By means of the apparatus according to the present invention, which is shown in FIG. 1, the reaction liquid 5 can be evaporated partly or fully. For this purpose, the cooling liquid is sucked out of the cold finger 6 by means of the vacuum conduit 10 in the open condition of valve 9. Valve 7 is closed at this time. For reducing the boiling temperature during the evaporation process, the interior of the pressure vessel 1 is connected to the vacuum conduit 70 by opening the valve 16, and evacuated. By means of the purge gas, the evaporated liquid is discharged from the first gas conduit 12 via the valve 16 and the vacuum conduit 70. The flow rate of the purge gas is adjusted with the aid of the restrictor 17.

Figure 2:
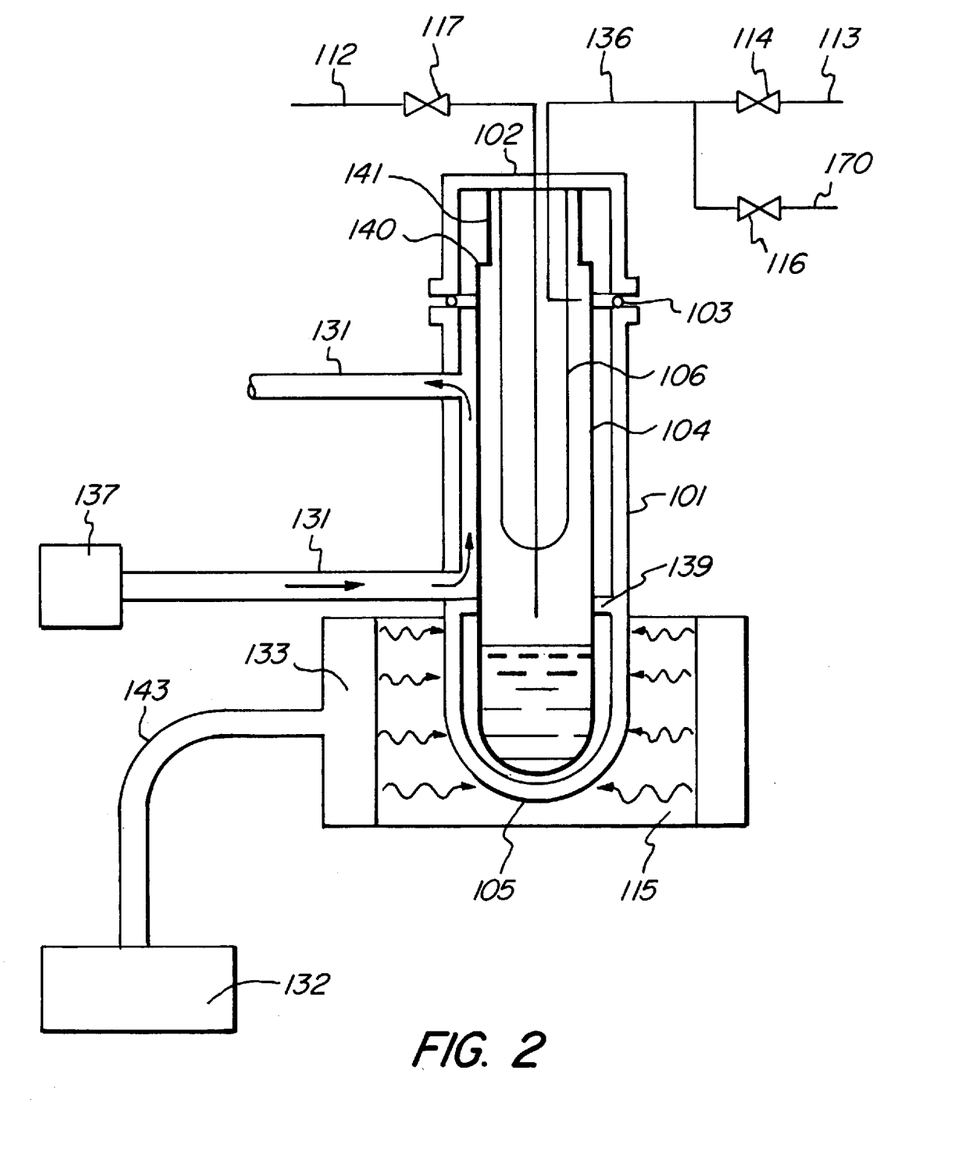
FIG. 2 shows a schematic side view of a second embodiment of the apparatus for carrying out wet chemical reactions under pressure according to the present invention.

FIG. 2 shows a schematic side view of a second embodiment of the apparatus for carrying out wet chemical reactions under pressure according to the present invention. The elements that are identical with or similar to those of the first embodiment are designated by corresponding reference numerals in FIG. 2; said reference numerals have, however, been augmented by 100. A detailed description of the elements and of their functions, which have already been described for the first embodiment with reference to FIG. 1, is dispensed with in the case of the second embodiment. In this connection, the relevant description concerning FIG. 1 is referred to.

The second embodiment according to FIG. 2 differs from the first embodiment insofar as, instead of or in addition to the cold finger, a recondensation device is provided in the form of a means for applying a cooling gas stream to an area of the reaction vessel constituting an upper area with regard to the direction of the force of gravity. The means for applying a cooling gas stream comprises a source of cooling gas 137 connected via a cooling gas conduit 131 to the interior of the pressure vessel 101 in an upper area of the reaction vessel. The gas conduit 131 extends from the interior of the pressure vessel to the outside thereof at a second point of said pressure vessel. The lower area of the pressure vessel 101, in which the reaction liquid 105 can be provided in the reaction vessel 104, is preferably, but not necessarily, separated through a seal 139 in a gastight manner from the area acted upon by the cooling gas from the source of cooling gas 137. For preventing the cooling gas coming from source 137 from mixing with the purge gas coming from a source 112, further sealing means 140 can be provided between a projection 141 of the cover 102 and the reaction vessel 104. The first gas conduit 112 used for feeding the purge gas via the restrictor 117 and the second gas conduit 136 used for removing the purge gas and the gaseous reaction products via the second restrictor 114 to the outlet 113 extend either through the additionally provided cold finger 106 or parallel thereto.

The second embodiment of the apparatus for carrying out wet chemical reactions under pressure according to the present invention is operated in a manner corresponding to the mode of operation of the first embodiment that has been described with reference to FIG. 1. However, according to said second embodiment, the cooling for recondensing evaporated reaction liquid can be carried out alternatively or additionally by cooling the upper area of the reaction vessel by means of the cooling gas circulated from the source 137 via conduit 131.

To make things easier, the conduits for filling and emptying the cold finger 106 have been omitted in FIG. 2. The cold finger according to the second embodiment can, however, be provided with the same connection and discharge conduits as the cold finger of the first embodiment.

Figure 3:
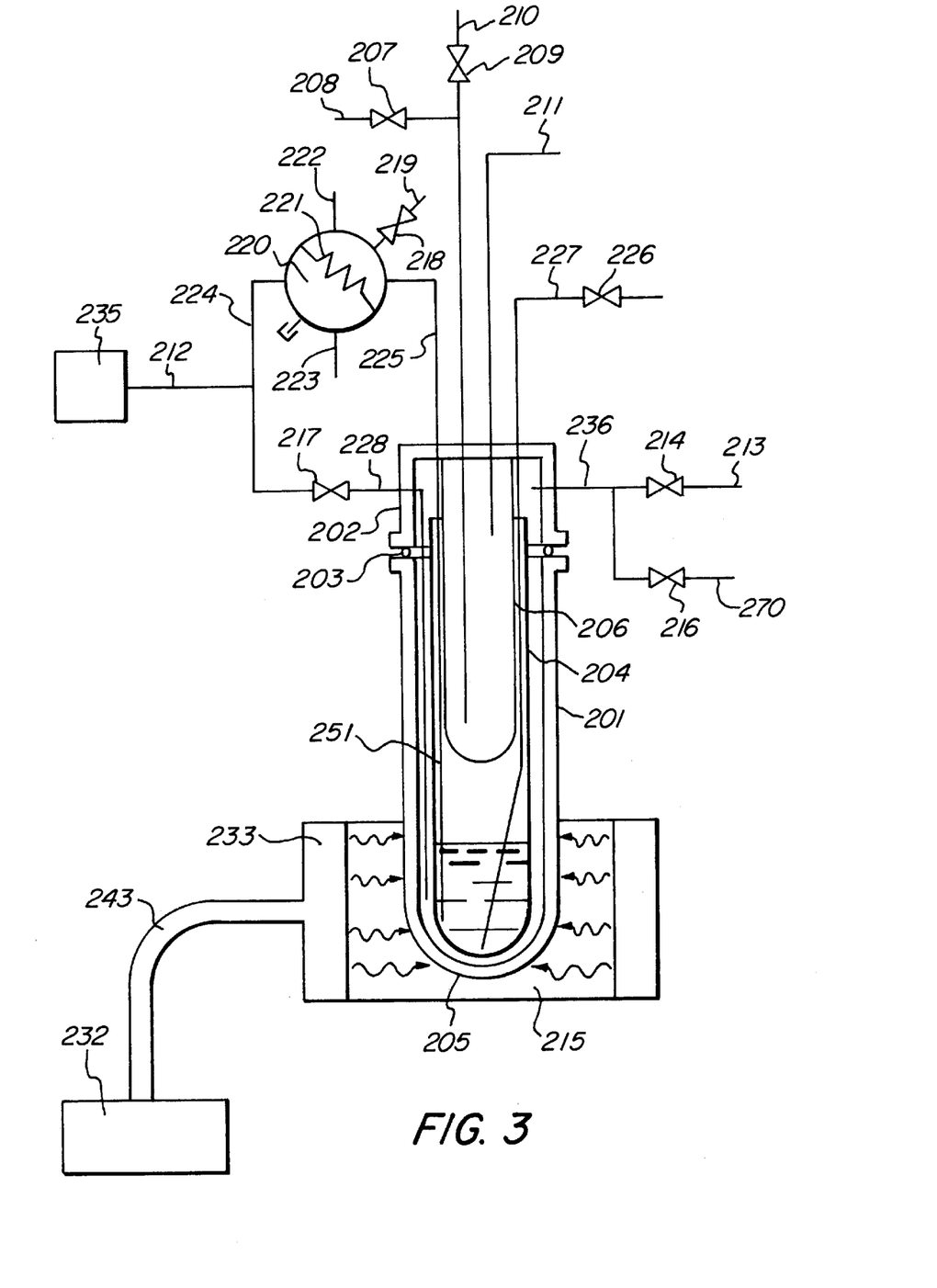
FIG. 3 shows a schematic side view of a third embodiment of the apparatus for carrying out wet chemical reactions under pressure according to the present invention.

In FIG. 3, a third embodiment of the apparatus for carrying out wet chemical reactions under pressure according to the present invention is shown. Also in this case, elements that are similar to or identical with those of the first embodiment are designated by corresponding reference numerals, but now said reference numerals have been augmented by 200. A detailed description of the elements of the third embodiment is dispensed with at this point and reference is made to the corresponding description of these elements and of their function in connection with the first embodiment.

The third embodiment differs from the first embodiment insofar as there are provided an additional system for feeding gaseous or liquid reaction substances into the reaction vessel as well as a discharge conduit 227 including a valve 226 for discharging reaction liquid 205 from the reaction vessel 204.

The device for feeding gaseous or liquid reaction substances comprises a multiway valve 220 with a sample loop 221. The multiway valve has 8 connections a, b, c, d, e, f, g and h. The connections a and e communicate with said sample loop 221. Connection b communicates with conduit 222, connection c with valve 218, connection d with conduit 225, connection f with conduit 223 and connection h with conduit 224. Connection g is tightly sealed. Conduit 222 is e.g. connected to a supply of reaction liquid. Conduit 223 can in this case be connected to an outlet or to a waste collecting tank. Conduit 224 is connected to the first gas conduit 212 and the source 235 for the pressurized purge gas. Conduit 225 is connected to a conduit 251 which extends through the cover 202 into the interior and down to the bottom of the reaction vessel 204.

Figure 4:
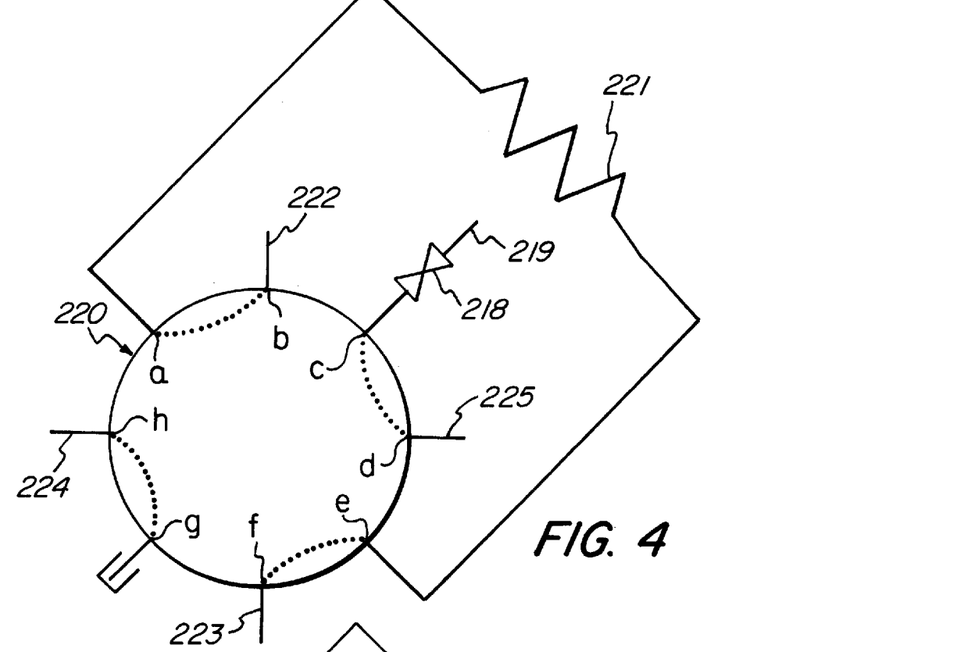
FIG. 4 shows a schematic representation of a multiway valve for the third embodiment shown in FIG. 3, at a first position.
Figure 5:
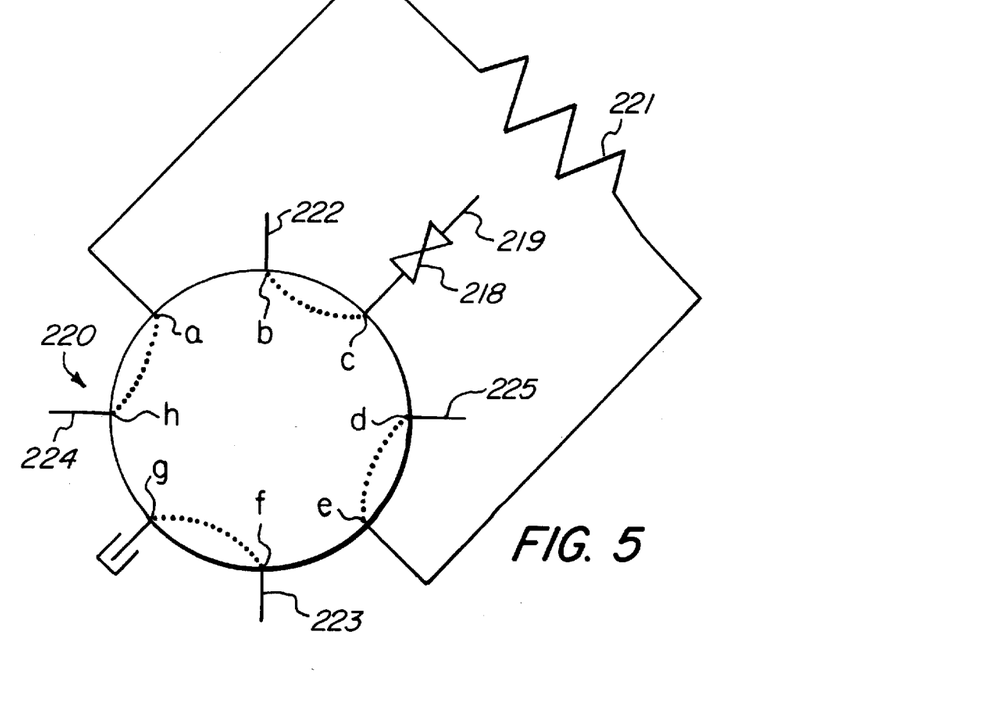
FIG. 5 shows the multiway valve shown in FIG. 4, at a second position.

FIGS. 4 and 5 show a first and a second position of the multiway valve 220 shown in FIG. 3. At the first position shown in FIG. 4, one end of the sample loop 221 communicates with connection a, and the second end of the sample loop 221 communicates with connection e. It is thus possible to fill the sample loop 221 via line 222 with a liquid reagent independently of the pressure within the pressure vessel 1.

When the multiway valve 220 is switched over from the first position to the second position shown in FIG. 5, one end of the sample loop 221 is connected to conduit 224 and the other end of said sample loop 221 is connected to conduit 225. The sample loop 221 is connected to the pressurized purge gas conduit 212 in this way. By means of the pressure of the purge gas, the reagent contained in the sample loop 221 is fed into the reaction vessel 204 via the conduit 225 and via the conduit 251 extending through the cover 202. Also in the case of the third embodiment, the boiling temperature is determined by the purge gas pressure selected.

Whereas at the first position shown at FIG. 4, the sample loop is filled e.g. with a liquid reagent via conduit 222, conduit 225, which communicates with the interior of the reaction vessel via the conduit 251 extending through the cover 202, is connected to a gas conduit 219 via a valve 218. Said gas conduit 219 can be used for introducing at a first position, e.g. in the period of time in which the sample loop 221 is filled, a gaseous reagent, e.g. halogen or ozone, into the reaction liquid 205 from said conduit 219 and via conduit 225. A continuous supply of gaseous reagents is thus possible when valve 218 is open at the first position of the multiway valve 220.

For a discontinuous feed of reagents, valve 218 is closed and the reagent filled into the sample loop 221 at the first position is fed by switching the multiway valve over to the second position shown in FIG. 5. When the feeding of the reagent contained in the sample loop 221 has been finished, the multiway valve 220 is switched back from said second position to the first position so that the filling and feeding process can be started again.

Although the third embodiment shown in FIG. 3 is only shown with the cold finger 206 for recondensing evaporated reaction liquid, it is, of course, also possible to provide the kind of recondensation according to the second embodiment shown in FIG. 2.

The discharge of the reaction liquid 205 from the reaction vessel 204 can also take place under pressure with the aid of the pressure of the purge gas in the pressure vessel 201. For this purpose, the valve 226 included in the discharge conduit 227 is opened; this has the effect that, due to the pressure prevailing in the interior, the reaction liquid 205 is forced into the discharge conduit 227 extending from the bottom of the reaction vessel 204. For rinsing the reaction vessel 204 subsequently, specific volumes of a suitable rinsing liquid are successively fed via the multiway valve 220.

Figure 6:
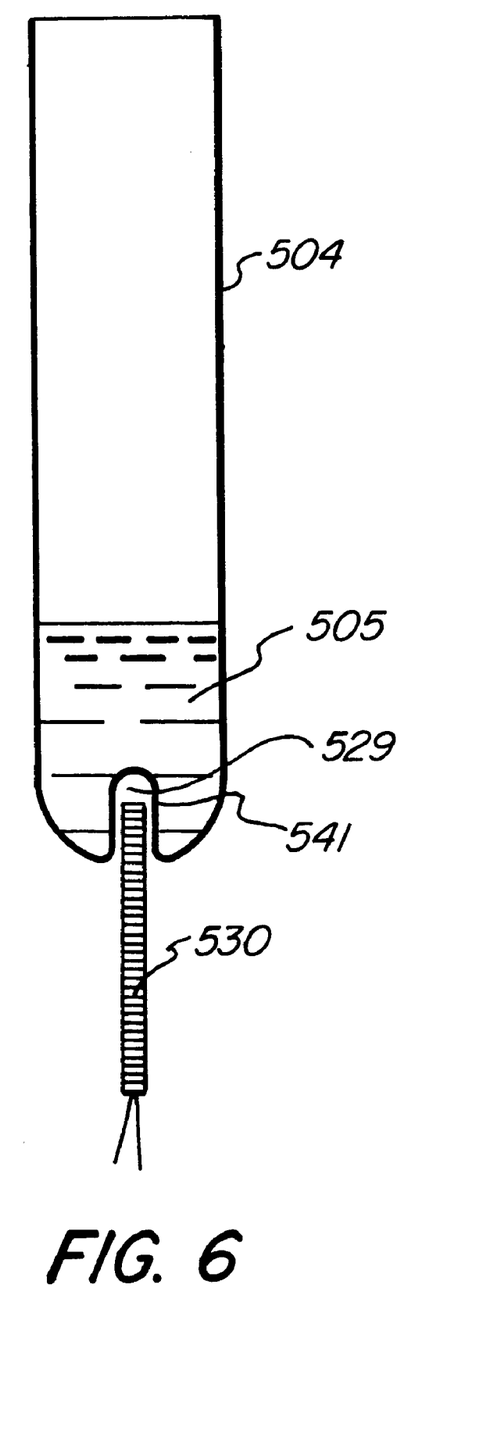
FIG. 6 shows a schematic view of a reaction vessel provided with a temperature sensor.

The apparatus for carrying out wet chemical reactions under pressure according to the present invention is preferably provided with a temperature sensor which is shown in FIG. 6. The temperature sensor, which can be a thermocouple, a resistance sensor, an infrared sensor or a fibre optics with fluorescence measurement, extends through the pressure vessel in a gastight arrangement, and it is arranged in a channel indentation 529 provided in the bottom 541 of the reaction vessel 504. By means of the embodiment of the reaction vessel 504 shown in FIG. 6 and on the basis of the arrangement of the temperature sensor 530, the temperature of the reaction liquid can be measured precisely.

For a simple oxidation of organic samples, a simple version of the apparatus without any means for bleeding the reaction liquid will suffice. It is then not necessary to suck off the cooling liquid. The elements designated by reference numerals 9 and 10 are therefore not provided in the case of this simple embodiment. In view of the fact that no vacuum is applied, the elements designated by reference numerals 16, 70 and 17 are not provided either.

In all the embodiments described hereinbefore, the reaction vessel consists preferably of PTFE or of quartz. Various fluoridized polymers, such as e.g. PTFE, PFA or PTFE-TFM, can be used for the reaction vessel. When vessels consisting of PTFE are used, temperatures up to 250° C. can be applied in the case of microwave heating. When quartz vessels are used, temperatures up to and above 300° C. can be be applied in the case of microwave heating.

In the following, the apparatus according to the present invention is compared with a commercially available apparatus used for carrying out wet chemical reactions under pressure and provided with microwave heating, said last-mentioned apparatus being known from the prior art. The commercially available system is a system produced by the firm of Anton Paar in Graz/Austria under the name of PDM. In the comparison tests, reaction vessels holding 50 ml are used; in said respective reaction vessels 100 mg, 130 mg and 160 mg sorbite monolaurate are oxidized with 2 ml nitric acid. For this purpose, the respective sample amount is introduced into the 50 ml reaction vessel consisting of quartz glass and the 2 ml nitric acid (65%) are added thereto. The vessel is closed and treated at a reaction pressure of 30 bar in the commercially available PDM apparatus for a period of 10 minutes. When the weighed portion is 100 mg, 88% of the sample are oxidized, when it is 130 mg, 80% are oxidized, and when it is 160 mg, only 68% of the sample are oxidized. In the apparatus according to the present invention, the same sample amounts are oxidized again in 50 ml quartz vessels in the dynamic pressure system, each of said sample amounts being again oxidized with 2 ml nitric acid (65%) at a pressure of 30 bar. The purge gas used is nitrogen. The flow rate for the purge gas is 100 ml per minute. The reaction takes place for a period of 10 minutes, the microwave power being 600 W. This method has the effect that, independently of the weighed sample amounts, 95% of the sorbite monolaurate are oxidized whereby $CO_2$ and $H_2O$ are formed.

What is claimed is:

1. An apparatus for carrying out wet chemical reactions under pressure comprising a pressure vessel (1) in which a reaction liquid (5) can be provided and which is adapted to be sealed in pressure fight manner by closure means (2, 3), characterized in that:

a rinsing device is provided for rinsing the pressure vessel while removing the gaseous reaction products from the pressurized pressure vessel and while maintaining a predetermined pressure therein, said rinsing device comprising:

a first gas conduit (12) for supplying pressurized gas to the pressure vessel (1), a second gas conduit (36) for venting gas between an interior of the pressure vessel (1) and an exterior of the pressure vessel (1), a first restrictor (14) disposed within said second gas conduit (36) to restrict the flow of venting gas through said second gas conduit (36), and a second restrictor (17) disposed within said first gas conduit (12) and immediately prior to the pressure vessel (1) to restrict a flow rate of the pressurized gas through said first gas conduit (12), said first and said second restrictors being correspondingly adjustable for maintaining consistent pressure within the pressure vessel (1), a vacuum tube (70) branching off said second gas conduit (36) prior to first restrictor (14) for selectively supplying a partial vacuum to the pressure vessel (1), and a reaction vessel (4) is provided within the pressure vessel (1) wherein gaseous reaction products can flow through said first restrictor (14) to an outlet (13).

2. An apparatus according to claim 1, characterized in that said rinsing device comprises a source (35) for a pressurized gas as well as a first gas conduit (12) extending from said source (35) into the interior of the pressure vessel, and, in addition, a second gas conduit (36) extending from the interior of said pressure vessel to the outside thereof and including a first restrictor (14) for producing a first predetermined flow rate.

3. An apparatus according to claim 2, characterized in that a second restrictor (17) is provided in said first gas conduit (12) so as to produce a predetermined second flow rate.

4. An apparatus according to claim 2, characterized in that a pressure regulator valve (42) is provided in said first gas conduit (12) for adjusting the pressure of the pressurized gas to a predetermined value.

5. An apparatus according to claim 1, characterized in that a recondensation device is provided in the interior of the pressure vessel, said recondensation device being used for condensing evaporated reaction liquid.

6. An apparatus according to claim 5, characterized in that said recondensation device comprises means (131, 137) for applying a cooling gas stream to an area of a reaction vessel (104) constituting an upper area with regard to the direction of the force of gravity, said reaction vessel being arranged in the pressure vessel and being adapted to hold the reaction liquid in a lower area thereof.

7. An apparatus according to claim 6, characterized in that said means for applying a cooling gas stream comprises a source (137) for the cooling gas and supply and discharge conduits (131) for the cooling gas as well as means (139, 140) for a gas-tight separation between an upper part of the pressure vessel and a lower part of the pressure vessel, the area of the reaction vessel around which the cooling gas flows being located in said upper part of the pressure vessel.

8. An apparatus according to claim 5, characterized in that said recondensation device comprises a cooling body (6) which is adapted to be cooled down to a temperature at which the reaction liquid condenses.

9. An apparatus according to claim 8, characterized in that said cooling body can be filled with a cooling liquid.

10. An apparatus according to claim 9, characterized in that said cooling liquid can be caused to circulate through the cooling body.

11. An apparatus according to claim 9, characterized in that the cooling liquid can be removed from said cooling body.

12. An apparatus according to claim 11, characterized in that a suction conduit (10) is provided for removing the cooling liquid from said cooling body.

13. An apparatus according to claim 1, characterized in that a heating device is provided for increasing the temperature of the reaction liquid (5).

14. An apparatus according to claim 13, characterized in that said heating device comprises a microwave generator (32) for generating a microwave field (15) passing through the reaction liquid (5).

15. An apparatus according to claim 14, characterized in that said microwave field can be generated at least in an area of the pressure vessel in which the reaction liquid can be provided, and that the walls of the pressure vessel are microwave-transparent in this area.

16. An apparatus according to claim 1, characterized in that the walls of the reaction vessel consist of PTFE, PFA, PTFE-TFM or of quartz glass.

17. An apparatus according to claim 1, characterized in that a feed device is provided for feeding gaseous or liquid reaction substances into the interior of the pressure vessel while said pressure vessel is sealed in a pressure-tight manner by said closure means (2, 3).

18. An apparatus according to claimed, characterized in that said feed device comprises a multiway valve (220) with a sample loop (221), said multiway valve being adapted to be switched at least to a first and to a second position for receiving in said sample loop a substance to be fed under a preselectable pressure at said first position and for feeding the received substance into the pressurized pressure vessel at said second position.

19. An apparatus according to claim 9, characterized in that, at the second position of the multiway valve, one end of the sample loop is connected to a source (235) of pressurized purge gas and the other end of the sample loop is connected to a conduit (225) leading into the pressure vessel.

20. An apparatus according to one of the claim 18, characterized in that at said first position or at an additional third position reagents can be fed to the reaction vessel at a predeterminable flow rate.

21. An apparatus according to claim 1, characterized in that a temperature sensor (530) is provided for determining the temperature of the reaction liquid (505).

22. An apparatus according to claim 21, characterized in that the temperature sensor is arranged in a channel indentation (529) provided in the area oft he lower end of a reaction vessel (504) which is arranged in said pressure vessel and in which the reaction liquid can be provided in a lower area thereof.

23. An apparatus according to claim 21, characterized in that said temperature sensor (530) is a thermocouple, a resistance sensor, an infrared sensor or a fibre optics with fluorescence measurement.

24. An apparatus according to claim 1, characterized in that a discharge conduit (227) is provided by means of which the reaction liquid can be discharged, said discharge conduit (227) leading into the interior of the pressure vessel and extending from the bottom of a receptacle for the reaction liquid.

25. An apparatus according to claim 1, characterized in that the flow resistance of said second restrictor (17) is from about 10 to about 100 times lower than that of said first restrictor (14).

* * * * *